United States Patent
Niimi et al.

(10) Patent No.: US 9,997,772 B2
(45) Date of Patent: Jun. 12, 2018

(54) NEGATIVE-ELECTRODE MATERIAL FOR NONAQUEOUS-ELECTROLYTE SECONDARY BATTERY PRODUCTION PROCESS FOR THE SAME, NEGATIVE ELECTRODE FOR NONAQUEOUS-ELECTROLYTE SECONDARY BATTERY, AND NONAQUEOUS-ELECTROLYTE SECONDARY BATTERY

(71) Applicant: KABUSHIKI KAISHA TOYOTA JIDOSHOKKI, Kariya-shi, Aichi (JP)

(72) Inventors: Tomohiro Niimi, Kariya (JP); Yusuke Sugiyama, Kariya (JP); Nagisa Watanabe, Kariya (JP); Kazuhito Kawasumi, Kariya (JP); Masakazu Murase, Kariya (JP); Masataka Nakanishi, Kariya (JP)

(73) Assignee: KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 620 days.

(21) Appl. No.: 14/419,495

(22) PCT Filed: Aug. 23, 2013

(86) PCT No.: PCT/JP2013/004995
§ 371 (c)(1),
(2) Date: Feb. 4, 2015

(87) PCT Pub. No.: WO2014/034069
PCT Pub. Date: Mar. 6, 2014

(65) Prior Publication Data
US 2015/0188127 A1 Jul. 2, 2015

(30) Foreign Application Priority Data
Aug. 28, 2012 (JP) ................... 2012-187483

(51) Int. Cl.
*H01M 4/36* (2006.01)
*H01M 4/04* (2006.01)
(Continued)

(52) U.S. Cl.
CPC ............. *H01M 4/366* (2013.01); *C01B 33/32* (2013.01); *H01M 4/0471* (2013.01);
(Continued)

(58) Field of Classification Search
CPC .... H01M 4/366; H01M 4/483; H01M 4/5825; H01M 4/0471; H01M 4/625;
(Continued)

(56) References Cited

U.S. PATENT DOCUMENTS 5,395,711 A * 3/1995 Tahara .................. H01M 4/485
429/231.3
2007/0224508 A1 9/2007 Aramata et al.
(Continued)

FOREIGN PATENT DOCUMENTS

JP 06-325765 A 11/1994
JP 2007-294423 A 11/2007
(Continued)

OTHER PUBLICATIONS

International Search Report for PCT/JP2013/004995 dated Oct. 8, 2013.

*Primary Examiner* — Ula C Ruddock
*Assistant Examiner* — Matthew W Van Oudenaren
(74) *Attorney, Agent, or Firm* — Sughrue Mion, PLLC (57) ABSTRACT

Providing a negative-electrode material for nonaqueous-electrolyte secondary battery, the negative-electrode material including lithium silicate particles coated by a carbonaceous substance, a production process for the same, a negative electrode for nonaqueous-electrolyte secondary battery, and a nonaqueous-electrolyte secondary battery. A
(Continued)

negative-electrode material for nonaqueous-electrolyte secondary battery includes lithium silicate particles having a surface at least some of which is coated by a carbonaceous substance formed by heating a carbon-containing compound at a thermal decomposition temperature of the carbon-containing compound or more and 1,100±° C. or less, the carbon-containing compound being a solid at ordinary temperature and exhibiting a zeta-potential absolute value being 60 or more against N-methyl-2-pyrrolidone (or NMP).

10 Claims, 2 Drawing Sheets (51) Int. Cl.
| | |
|---|---|
| H01M 4/136 | (2010.01) |
| H01M 4/58 | (2010.01) |
| H01M 4/62 | (2006.01) |
| C01B 33/32 | (2006.01) |
| H01M 4/1397 | (2010.01) |
| H01M 4/48 | (2010.01) |
| H01M 10/0525 | (2010.01) |
| H01M 4/1395 | (2010.01) |
| H01M 4/134 | (2010.01) |
| H01M 4/02 | (2006.01) |

(52) U.S. Cl.
CPC ......... *H01M 4/136* (2013.01); *H01M 4/1397* (2013.01); *H01M 4/483* (2013.01); *H01M 4/5825* (2013.01); *H01M 4/625* (2013.01); *H01M 10/0525* (2013.01); *H01M 4/134* (2013.01); *H01M 4/1395* (2013.01); *H01M 2004/027* (2013.01); *Y02T 10/7011* (2013.01)

(58) Field of Classification Search
CPC ............... H01M 4/1397; H01M 4/136; H01M 2004/027; H01M 10/0525; C01B 33/32
See application file for complete search history.

(56) References Cited

U.S. PATENT DOCUMENTS

| | | | | |
|---|---|---|---|---|
| 2009/0202911 | A1* | 8/2009 | Fukuoka | ................. C23C 16/26 429/231.8 |
| 2011/0244334 | A1 | 10/2011 | Kawada | |
| 2013/0065126 | A1* | 3/2013 | Caldwell | ................. H01B 1/12 429/212 |
| 2013/0149606 | A1 | 6/2013 | Yasuda et al. | |

FOREIGN PATENT DOCUMENTS

| | | |
|---|---|---|
| JP | 2007-294433 A | 11/2007 |
| JP | 2011-113862 A | 6/2011 |
| JP | 2011-222153 A | 11/2011 |
| JP | 2013-534024 A | 8/2013 |
| WO | 2012/026067 A1 | 3/2012 |
| WO | 2012/039477 A1 | 3/2012 |

* cited by examiner

NEGATIVE-ELECTRODE MATERIAL FOR NONAQUEOUS-ELECTROLYTE SECONDARY BATTERY PRODUCTION PROCESS FOR THE SAME, NEGATIVE ELECTRODE FOR NONAQUEOUS-ELECTROLYTE SECONDARY BATTERY, AND NONAQUEOUS-ELECTROLYTE SECONDARY BATTERY

CROSS REFERENCE TO RELATED APPLICATIONS

This application is a National Stage of International Application No. PCT/JP2013/004995 filed Aug. 23, 2013, claiming priority based on Japanese Patent Application No. 2012-187483 filed Aug. 28, 2012, the contents of all of which are incorporated herein by reference in their entirety.

TECHNICAL FIELD

The present invention relates to a negative-electrode material for nonaqueous-electrolyte secondary battery, a production process for the same, a negative electrode for nonaqueous-electrolyte secondary battery, and a nonaqueous-electrolyte secondary battery.

BACKGROUND ART

Nonaqueous-electrolyte secondary batteries, such as lithium-ion secondary batteries, are secondary batteries having high charge and discharge capacities and enabling high powers to output. At present, lithium-ion secondary batteries have been used mainly as a power source for portable electronic devices. In addition, lithium-ion secondary batteries are expected to serve as a power source for electric automobiles having been anticipated to prevail from now on. Consequently, a lithium-ion secondary battery with a much higher capacity has been desired. The selection and designing of negative-electrode active materials have been investigated in order to obtain high-capacity lithium-ion secondary batteries.

In recent years, as a negative-electrode active material for lithium-ion secondary battery, materials including an element being able to alloy with lithium, such as Si and Sn possessing charge and discharge capacities exceeding the theoretical capacity of carbonaceous material greatly, have been investigated. For example, as a negative-electrode active material, $SiO_x$ (where 0<"x"<2) with a high capacity and superior cyclability has been proposed. $SiO_x$ (where 0<"x"<2) is a general formula expressing a generic name for amorphous silicon oxide obtainable by using silicon dioxide ($SiO_2$) and metallic silicon (Si) as the raw materials. When $SiO_x$ is heat treated, the $SiO_x$ is separated into two phases, an Si phase and an $SiO_2$ phase, by the internal reaction of solid. The Si phase obtainable by the separation is very fine, and the Si phase is dispersed inside the $SiO_2$ phase. Of Li being inserted into $SiO_x$ during initial charging, Li being inserted into the $SiO_2$ phase is less likely to be eliminated at the time of discharging. Consequently, $SiO_x$ has a large so-called irreversible capacity. Hence, in order to decrease the irreversible capacity, using a silicon oxide containing lithium, or a silicate containing lithium, as a negative-electrode active material has been proposed. For example, in Patent Application Publication No. 1 (i.e., Japanese Unexamined Patent Publication (KOKAI) Gazette No. 6-325765) proposes a silicon oxide containing lithium (i.e., $Li_xSiO_y$) as a negative-electrode active material. Patent Application Publication No. 1 sets forth the following: the silicon oxide containing lithium contains lithium inside the crystal structure of the oxide of silicon or within the amorphous structure; and the silicon oxide containing lithium is able to occlude and release (or sorb and desorb) lithium ions by electrochemical reactions in a nonaqueous electrolyte.

Patent Application Publication No. 1 exemplifies, as the silicon oxide containing lithium (i.e., $Li_xSiO_y$), various lithium silicates, and also sets forth the following as well: using the lithium silicates as a negative-electrode active material results in enabling the irreversible capacity of Li to reduce. However, when the lithium silicates are used as a negative-electrode active material, eliminating lithium ions from the negative-electrode active material and inserting lithium ions into the negative-electrode active material at migration rates required for lithium-ion secondary battery is difficult, because the lithium silicates have an extremely small electron-conducting property.

Investigations for coating carbon, one of electrically-conductive materials, on $Li_xSiO_y$ have been carried out. Patent Application Publication No. 2 (i.e., Japanese Unexamined Patent Publication (KOKAI) Gazette No. 2007-294423) proposes a silicon/silicon oxide/lithium-based composite turned conductive electrically by coating the surface of silicon/silicon oxide/lithium-based composite particles with carbon in a coating amount of from 5% by mass to 50% by mass. Patent Application Publication No. 2 sets forth the following: carbon is coated onto a silicon/silicon oxide/lithium-based composite by a thermal CVD method; and the carbon has a graphite structure exhibiting a peak at around 1,580 $cm^{-1}$ in a Raman spectrum. However, Patent Application Publication No. 2 does not set forth any example in which carbon is coated on a silicon/silicon oxide/lithium-based composite.

Moreover, Patent Application Publication No. 3 (i.e., Japanese Unexamined Patent Publication (KOKAI) Gazette No. 2011-222153) proposes a negative-electrode material comprising a silicon/silicon oxide-based composite, and a carbon film coated on a surface of the silicon/silicon oxide-based composite, wherein at least the silicon/silicon oxide-based composite is doped with lithium and an SiC peak is less in X-ray diffraction. Patent Application Publication No. 3 sets forth a method in which carbon coating is carried out to the silicon/silicon oxide-based composite at a temperature of 1,100° C. or more by a thermal CVD method followed by doping the silicon/silicon oxide-based composite with lithium.

Thus, no lithium silicate coated by an electrically-conductive material has not been found in related art.

PATENT LITERATURE

Patent Application Publication No. 1: Japanese Unexamined Patent Publication (KOKAI) Gazette No. 6-325765;

Patent Application Publication No. 2: Japanese Unexamined Patent Publication (KOKAI) Gazette No. 2007-294423; and Patent Application Publication No. 3: Japanese Unexamined Patent Publication (KOKAI) Gazette No. 2011-222153

SUMMARY OF INVENTION

Technical Problem

The present inventors have investigated coating a carbonaceous substance onto the surface of lithium silicate particles in order to raise the electrically-conducting property of lithium silicate. Although the present inventors have investigated coating a carbonaceous substance onto the surface of lithium silicate particles by a liquid phase method using a carbon-containing compound having been used usually in order to coat Si and $SiO_x$ with carbon, the inventors have found out that coating a carbonaceous substance onto lithium silicate particles is impossible by the conventional method.

The present invention is made in view of such circumstances. An object of the present invention is to provide a process for coating a carbonaceous substance onto lithium silicate particles. The object accompanies another object of the present invention directed to providing the following: a negative-electrode material for nonaqueous-electrolyte secondary battery, the negative-electrode material comprising lithium silicate particles coated by a carbonaceous substance; a production process for the same; a negative electrode for nonaqueous-electrolyte secondary battery; and a nonaqueous-electrolyte secondary battery.

Solution to Problem

As a result of wholehearted investigations by the present inventors, the present inventors found out that doing the following results in making coating a carbonaceous substance onto lithium silicate particles possible: selecting a carbon-containing compound being solid at ordinary temperature and exhibiting a zeta-potential absolute value being 60 or more against N-methyl-2-pyrrolidone (or NMP); and then heating the selected carbon-containing compound at the thermal decomposition temperature or more and 1,100° C. or less.

That is, a negative-electrode material for nonaqueous-electrolyte secondary battery according to the present invention comprises lithium silicate particles having a surface at least some of which is coated by a carbonaceous substance formed by heating a carbon-containing compound at a thermal decomposition temperature of the carbon-containing compound or more and 1,100° C. or less, the carbon-containing compound being a solid at ordinary temperature and exhibiting a zeta-potential absolute value being 60 or more against N-methyl-2-pyrrolidone (or NMP).

Preferable lithium silicate particles are at least one member selected from the group consisting of $Li_4SiO_4$, $Li_2SiO_3$, $Li_2Si_2O_5$, $Li_4Si_3O_8$, $Li_6Si_4O_{11}$, and $LiSiO_{1.5}$.

A preferable carbon-containing compound is at least one member selected from the group consisting of polycarbonate (or PC), polymethyl methacrylate (or PMMA), and polyamide-imide (or PAI).

A preferable carbonaceous substance comprises an amorphous structure showing a peak (or "D" band) at around 1,360 $cm^{-1}$ and another peak (or "G" band) at around 1,580 $cm^{-1}$ in a Raman shift.

A production process for negative-electrode material for nonaqueous-electrolyte secondary battery according to the present invention comprises:

a carbon-containing compound selection step of selecting a carbon-containing compound being solid at ordinary temperature and exhibiting a zeta-potential absolute value being 60 or more against N-methyl-2-pyrrolidone (or NMP);

a solution preparation step of preparing a carbon-containing compound solution by dissolving the carbon-containing compound selected at the carbon-containing compound selection step in an organic solvent in a concentration of from 5% by mass to 50% by mass;

a mixing step of preparing a mixture by mixing lithium silicate particles with the carbon-containing compound solution in such a solid-content ratio as (the lithium silicate particles):(the carbon-containing compound)=from 10:1 to 10:100; and a heating step of heating the mixture at a thermal decomposition temperature of the carbon-containing compound or more and 1,100° C. or less under an inert atmosphere, or under a reducing atmosphere.

A preferable carbon-containing compound to be selected is polycarbonate (or PC), polymethyl methacrylate (or PMMA), or polyamide-imide (or PAI).

A negative electrode for nonaqueous-electrolyte secondary battery according to the present invention comprises the aforementioned negative-electrode material.

Preferably, the negative electrode for nonaqueous-electrolyte secondary battery according to the present invention further comprises a negative-electrode active material including $SiO_x$ (where 0<"x"<2) or Si.

A nonaqueous-electrolyte secondary battery according to the present invention comprises the aforementioned negative electrode.

Another production process for negative-electrode material for nonaqueous-electrolyte secondary battery according to the present invention comprises:

a carbon-containing compound selection step of selecting a carbon-containing compound being solid at ordinary temperature and exhibiting a zeta-potential absolute value being 60 or more against N-methyl-2-pyrrolidone (or NMP);

a solution preparation step of preparing a carbon-containing compound solution by dissolving the carbon-containing compound selected at the carbon-containing compound selection step in an organic solvent in a concentration of from 5% by mass to 50% by mass;

a mixing step of preparing a mixture by mixing a particulate mixture including lithium silicate particles and $SiO_x$ particles (where 0<"x"<2) or Si particles with the carbon-containing compound solution in such a solid-content ratio as (the particulate mixture):(the carbon-containing compound)=from 10:1 to 10:100; and a heating step of heating the mixture at a thermal decomposition temperature of the carbon-containing compound or more and 1,100° C. or less under an inert atmosphere, or under a reducing atmosphere.

Advantageous Effects of Invention

The negative-electrode material for nonaqueous-electrolyte secondary battery according to the present invention comprises lithium silicate particles having a surface at least some of which is coated by a carbonaceous substance. Since lithium silicate particles have high affinity to lithium ions, lithium ions are transported selectively in the vicinity of the lithium silicate particles. Moreover, when $SiO_x$ or Si is used as a negative-electrode active material, containing the lithium silicate particles in the negative-electrode material results in reducing the irreversible capacity of Li. In addition, since at least some of the surface of the lithium silicate particles is coated by a carbonaceous substance, the lithium silicate particles coated by the carbonaceous substance exhibit an electrically-conducting property. Consequently, adopting a negative electrode comprising the aforementioned negative-electrode material leads to making the following possible: making the lithium silicate particles less likely to turn into a resistance. Thus, the resulting nonaqueous-electrolyte secondary battery exhibits large charge and discharge capacities, and provided with superb performance in the cyclability.

The production process for negative-electrode material for nonaqueous-electrolyte secondary battery according to the present invention makes possible coating a carbonaceous substance onto at least some of the surface of lithium silicate particles.

DESCRIPTION OF EMBODIMENTS

Negative-Electrode Material for Nonaqueous-Electrolyte Secondary Battery

A negative-electrode material for nonaqueous-electrolyte secondary battery according to the present invention comprises lithium silicate particles having a surface at least some of which is coated by a carbonaceous substance.

A preferable lithium silicate particles are at least one member selected from the group consisting of $Li_4SiO_4$, $Li_2SiO_3$, $Li_2Si_2O_5$, $Li_4Si_3O_8$, $Li_6Si_4O_{11}$, and $LiSiO_{1.5}$.

Since the lithium silicate particles have high affinity to lithium ions, lithium ions are transported selectively in the vicinity of the lithium silicate particles. When the lithium silicate particles are included in a negative-electrode material, a negative electrode upgrades in the lithium-ion conducting property, so that fully demonstrating a capacity possessed by a negative-electrode active material is possible, and thereby upgrading the cyclability is enabled.

Moreover, when $SiO_x$ or Si is used for a negative-electrode active material, containing the lithium silicate particles in the negative-electrode material leads to making the lithium silicate particles contained in the negative-electrode material inhibit lithium from diffusing within the $SiO_2$ matrix in $SiO_x$ and inhibit lithium from reacting with $SiO_2$ to turn into lithium silicate at the time of initial charging. Consequently, the irreversible capacity of Li is reduced.

A preferable average particle diameter of the lithium silicate particles is from 2 μm to 100 μm. Moreover, a more preferable average particle of the lithium silicate particles is from 2 μm or more to 40 μm or less. Although the lithium silicate particles are not believed to work as an active material directly or straightforwardly, the sorbing and desorbing of lithium occur even in the lithium silicate particles because the giving and receiving of lithium are carried out within a mixed agent including a negative-electrode active material and the lithium silicate particles. A size of the average particle diameter of the lithium silicate particles has an influence on a rate of the insertion and elimination reactions of lithium into and from the lithium silicate particles. When the average particle diameter of the lithium silicate particles falls in the aforementioned ranges, a rate of the insertion and elimination reactions of lithium into and from the lithium silicate particles stabilizes.

The smaller the average particle diameter of the lithium silicate particles is, the more greatly such an advantage is effected that the lithium silicate particles inhibit the generation of new lithium silicate generated by $SiO_2$ and lithium reacting one another.

The lithium silicate particles are synthesizable by a chemical process as set forth below. Moreover, as the lithium silicate particles, commercially available products are also usable.

As a process for chemically synthesizing the lithium silicate particles, the following method is exemplified: the lithium silicate particles are synthesized by mixing lithium, silicon, and an elementary substance of the other metallic element or nonmetallic element or a compound of the elementary substance one another in predetermined molar ratios and then heating the constituent elements in air or in an atmosphere comprising oxygen. When using, as a lithium compound and a silicon compound, oxides of the compounds, hydroxides thereof or other oxide-containing compounds thereof, heat-synthesizing the lithium silicate particles is also feasible in an inert atmosphere, in a non-oxidizing atmosphere within a vacuum, or in an atmosphere with a controlled oxygen amount. Of the above starting raw materials, one of the following is especially preferable as for the lithium compound: lithium oxide ($Li_2O$), lithium peroxide ($Li_2O_2$), lithium hydroxide (LiOH), lithium carbonate ($Li_2CO_3$), and lithium nitrate ($LiNO_3$). As for the silicon compound, one of the following is especially preferable: silicon oxide (such as silicon dioxide ($SiO_2$) or silicon monoxide (SiO)), hydrates of the silicon oxides, orthosilicate ($H_4SiO_4$), meta-silicate ($H_2SiO_3$), and meta-disilicate ($H_2Si_2O_5$). The aforementioned lithium compounds and silicon compounds are readily decomposed by heating, so that oxides are likely to be generated, and thereby the compounds are likely to form solid solutions.

The lithium silicate particles synthesized chemically as aforementioned are usable as they are. Alternatively, the lithium silicate particles are also usable after being subjected to a process, such as pulverization granulating or pelletizing, if needed.

The lithium silicate particles are coated by a carbonaceous substance on at least some of the surface. Being coated by the carbonaceous substance results in imparting an electrically-conducting property to the lithium silicate particles.

The carbonaceous substance is formed by heating a carbon-containing compound at a thermal decomposition temperature of the carbon-containing compound or more and 1,100° C. or less. The carbon-containing compound is a solid at ordinary temperature, and exhibits a zeta-potential absolute value being 60 or more against N-methyl-2-pyrrolidone (or NMP). A formation of the carbonaceous substance is explained in a production process described below.

A preferable carbon-containing compound is at least one member selected from the group consisting of polycarbonate (or PC), polymethyl methacrylate (or PMMA), and polyamide-imide (or PAI). The carbon-containing compound is also explained in a production process described below.

A preferable carbonaceous substance comprises an amorphous structure showing a peak (or "D" band) at around 1,360 $cm^{-1}$ and another peak (or "G" band) at around 1,580 $cm^{-1}$ in a Raman shift. When carbon makes an amorphous structure, both "D" band and "G" band appear definitely in a Raman shift. The carbonaceous substance comprising an amorphous structure is believed to be more likely to deform than is the carbonaceous substance comprising a graphite structure. Consequently, coating the carbonaceous substance comprising an amorphous structure onto at least some of a surface of the lithium silicate particles makes the lithium silicate particles more likely to be subjected to buffering upon expanding or contracting accompanied by the insertion or elimination of lithium.

In Raman spectra, the following might possibly occur due to differences between the wavelengths of incident lights, or between the resolutions: the number of peaks changes; or the peak-top position deviates. Therefore, when Raman spectra of the aforementioned carbonaceous substance are measured, the following peaks are ascertained: peaks identical with the peak (or "D" band) at around 1,360 $cm^{-1}$ and the other peak (or "G" band) at around 1,580 $cm^{-1}$; or peaks differing slightly from the peak (or "D" band) at around 1,360 $cm^{-1}$ and the other peak (or "G" band) at around 1,580 $cm^{-1}$ in the number or in the peak-top position.

Production Process for Negative-Electrode Material for Nonaqueous-Electrolyte Secondary Battery A production process for negative-electrode material for nonaqueous-electrolyte secondary battery according to the present invention comprises a carbon-containing compound selection step, a solution preparation step, a mixing step, and a heating step.

At the carbon-containing compound selection step, a carbon-containing compound is selected. The carbon-containing compound to be selected is solid at ordinary temperature, and exhibits a zeta-potential absolute value being 60 or more against N-methyl-2-pyrrolidone (or NMP).

The carbon-containing compound is solid at ordinary temperature. When being solid at ordinary temperature, the carbon-containing compound precipitates uniformly onto a surface of the lithium silicate particles, accompanied by the evaporation of a solvent. Moreover, the "carbon-containing compound" designates compounds being soluble in an organic solvent, being able to carbonize when being heated, and accordingly making a carbon source. As the carbon-containing compound, the following are given, for instance: organic polymers, hydrocarbons, polyol compounds (such as sugars, lactose, cellulose and starch), and pitches.

In order to select a carbon-containing compound exhibiting a zeta-potential absolute value being 60 or more against N-methyl-2-pyrrolidone (or NMP), a zeta potential of the carbon-containing compound is measured against N-methyl-2-pyrrollidone (or NMP).

A "zeta potential" is a potential for showing the charged state of particles dispersed within a liquid. Moreover, a zeta potential is used as an index for the dispersion stability of particles dispersed within a liquid. In the case of fine particles, the repulsive forces between the particles intensify when a zeta-potential absolute value increases, and thereby the dispersion stability of the particles heightens. The particles become likely to agglomerate when the zeta potential approaches zero.

When particles are likely to agglomerate, agglomerated sites of the particles occur within a liquid. When a carbon-containing compound being likely to agglomerate is used, since the carbon-containing compound has precipitated on a surface of the lithium silicate particles in agglomerated states at a heating step set forth below, a carbonaceous substance formed of the agglomerated carbon-containing compound subjected to heating is less likely to coat a surface of the lithium silicate particles.

Since the higher a zeta-potential absolute value is the more the dispersibility of particles heightens, the particles are believed to be less likely to agglomerate so that the particles are dispersed in a uniform concentration within a liquid. From the results of Examples set forth below, the following were understood: making possible coating a carbonaceous substance onto at least some of a surface of the lithium silicate particles satisfactorily when a carbon-containing compound exhibiting a zeta-potential absolute value being 60 or more is selected. Selecting a carbon-containing compound exhibiting a zeta-potential absolute value being 100 or more is more preferable.

Although a zeta potential has varying absolute values depending on the types of liquids in which particles of interest are dissolved, the tendency of the absolute values being large or small does not vary depending on the types of liquids. Consequently, when a zeta potential of a carbon-containing compound is found against NMP, tendencies of the carbon-containing compound against the other liquids are also predictable. NMP is one of polar solvents, and possesses a high solubility. Consequently, since a variety of carbon-containing compounds are dissolvable in NMP, zeta potentials of various carbon-containing compounds are measurable against NMP.

Moreover, after choosing a carbon-containing compound exhibiting a zeta-potential absolute value being 60 or more by measuring a zeta potential thereof against NMP, selecting restrictively another carbon-containing compound exhibiting a higher zeta-potential absolute value against the employed liquid is also possible by further measuring another zeta potential thereof against the employed liquid.

A preferable carbon-containing compound to be selected is one of the following: polycarbonate (or PC), polymethyl methacrylate (or PMMA), or polyamide-imide (or PAI). When the carbon-containing compound is polycarbonate (or PC), polymethyl methacrylate (or PMMA), or polyamide-imide (or PAI), the lithium silicate particles are coated satisfactorily by a carbonaceous substance.

At the solution preparation step, a carbon-containing compound solution is prepared by dissolving the carbon-containing compound selected at the carbon-containing compound selection step in an organic solvent in a concentration of from 5% by mass to 50% by mass. A carbon-containing compound solution comprising the carbon-containing compound dissolved in a concentration of more than 50% by mass has a heightened viscosity, and thereby the carbon-containing compound solution becomes likely to undergo bumping at the time of the heating step. When a carbon-containing compound solution comprising the carbon-containing compound dissolved in a concentration of less than 5% by mass is prepared, a required solution amount becomes too much. Dissolving the carbon-containing compound in an organic solvent in a concentration of from 10% by mass to 30% by mass is more preferable.

An allowable organic solvent is a solvent being able to dissolve the carbon-containing compound therein. As an organic solvent, the following are employable, for instance: alcohols, such as isopropyl alcohol, butyl alcohol, ethylene glycol and glycerin; ketones, such as acetone, methyl ethyl ketone, butyl methyl ketone and cyclohexanone; NMP; N,N-dimethylformamide (or DMF); and N,N-dimethylacetamide (or DMA).

At the mixing step, a mixture is prepared by mixing the lithium silicate particles with the carbon-containing compound solution in such a solid-content ratio as (the lithium silicate particles):(the carbon-containing compound)=from 10:1 to 10:100. When the carbon-containing compound is present in an amount of from 1 to 100 with respect to the lithium silicate particles taken as 10 by solid-content ratio, coating a carbonaceous substance onto a surface of the lithium silicate particles in a thickness of from 100 nm to 1,000 nm is possible.

At the heating step, the mixture is heated at a thermal decomposition temperature of the carbon-containing compound or more and 1,100° C. or less under an inert atmosphere, or under a reducing atmosphere. The carbon-containing compound is carbonized by heating the mixture at a thermal decomposition temperature of the carbon-containing compound or more and 1,100° C. or less under an inert atmosphere or under a reducing atmosphere, and then turns into a carbonaceous substance. When the carbon-containing compound is heated at a temperature higher than 1,100° C., carbon reacts with silicon, and thereby SiC has generated. When SiC generates, the electric conductivity of the lithium silicate particles coated by the carbonaceous substance has declined.

Using the aforementioned production process for negative-electrode material for nonaqueous-electrolyte secondary battery makes possible producing a negative-electrode material for nonaqueous-electrolyte secondary battery, the negative-electrode material comprising lithium silicate particles coated by a carbonaceous substance.

Moreover, the above-mentioned process for coating a carbonaceous substance onto lithium silicate particles is applicable to a mixture comprising lithium silicate particles and $SiO_x$ (where 0<"x"<2) particles or Si particles, so that the coating process makes possible coating a carbonaceous substance onto the respective surfaces of the lithium silicate particles and $SiO_x$ particles or Si particles. If such is the case, preparing a mixture by mixing a particulate mixture including lithium silicate particles and $SiO_x$ particles (where 0<"x"<2) or Si particles with the carbon-containing compound solution in such a solid-content ratio as (the particulate mixture):(the carbon-containing compound)=from 10:1 to 10:100 is permissible at the aforementioned mixing step.

Negative Electrode for Nonaqueous-Electrolyte Secondary Battery

A negative electrode for nonaqueous-electrolyte secondary battery according to the present invention comprises the negative-electrode material being aforementioned. Adopting a negative electrode comprising the aforementioned negative-electrode material leads to a nonaqueous-electrolyte secondary battery exhibiting large charge and discharge capacities, and provided with superb performance in the cyclability.

Besides the negative-electrode material being aforementioned, the negative electrode further comprises a negative-electrode active material.

An allowable negative-electrode active material is an active material comprising a material being able to sorb and desorb lithium. As for the negative-electrode active material, the following are given: carbonaceous materials being capable of sorbing and desorbing lithium; elements being capable of alloying with lithium; compounds comprising an element being capable of alloying with lithium; or polymeric materials.

As for the carbonaceous material, the following are given, for instance: non-graphitizable carbon, artificial graphite, cokes, graphites, glassy carbons, organic-polymer-compound calcined bodies, carbon fibers, activated carbon, or carbon blacks. Note herein that the "organic-polymer-compound calcined bodies" refer to calcined bodies carbonized by calicing polymeric materials, such as phenols and furans, at a proper temperature.

As for the element being capable of alloying with lithium, the following are exemplifiable: Na, K, Rb, Cs, Fr, Be, Mg, Ca, Sr, Ba, Ra, Ti, Ag, Zn, Cd, Al, Ga, In, Si, Ge, Sn, Pb, Sb, or Bi. Even among the elements, silicon (Si) or tin (Sn) is preferable, as the element being capable of alloying with lithium.

As for the compound comprising an element being capable of alloying with lithium, the following are exemplifiable: ZnLiAl, AlSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (where 0<"v"≤2), $SnO_2$ (where 0<"w"≤2), $SnSiO_3$, LiSiO, or LiSnO. As for the compound comprising an element being capable of alloying with lithium, a silicon compound or a tin compound is preferable. As for the silicon compound, $SiO_x$ (where 0<"x"<2) is preferable. As for the tin compound, tin alloys (such as Cu—Sn alloys and Co—Sn alloys) are exemplifiable.

As for the polymeric material, polyacetylene, or polypyrrole is exemplifiable.

A preferable negative-electrode active material comprises $SiO_x$ (where 0<"x"<2) or Si. The negative electrode containing the aforementioned negative-electrode material and $SiO_x$ (where 0<"x"<2) or Si results in reducing the irreversible capacity of Li. $SiO_x$ (where 0<"x"<2) comprises a structure including silicon dispersed in an $SiO_2$ matrix in the order of atom, or in a microcrystalline state.

Preferable $SiO_x$ particles or Si particles are $SiO_x$ particles or Si particles coated by a carbonaceous substance on at least some of the surface. For the $SiO_x$ particles or Si particles coated by a carbonaceous substance on at least some of the surface, a commercially available product is usable. Also usable are $SiO_x$ particles or Si particles coated by a carbonaceous substance on the surface in the same manner as the above-mentioned process for coating a carbonaceous substance onto lithium silicate particles. Even usable are $SiO_x$ particles or Si particles coated by a carbonaceous substance on the surface by a common carbon coating method.

When a negative electrode comprises: lithium silicate particles coated by a carbonaceous substance on at least some of the surface; and $SiO_x$ particles coated by a carbonaceous substance on at least some of the surface or Si particles coated by a carbonaceous substance on at least some of the surface, the resulting negative electrode is able to eliminate lithium ions from the active material and insert lithium ions into the active material at migration rates required for lithium-ion secondary battery. Consequently, the resultant negative electrode is able to exhibit a large capacity, and is simultaneously able to decline the large initial irreversible capacity serving adversely as a drawback when $SiO_x$ or Si is used as a negative-electrode active material.

As a method of preparing the aforementioned mixture, either of the following is available: a method comprising: the steps of making the lithium silicate particles coated by a carbonaceous substance on at least some of the surface, and the $SiO_x$ particles coated by a carbonaceous substance on at least some of the surface or the Si particles coated by a carbonaceous substance on at least some of the surface, respectively; and mixing the respective particles one another; and another method comprising the steps of: mixing lithium silicate particles and $SiO_x$ particles or Si particles one another to make a raw-material mixture; and carrying out a carbonaceous-substance coating treatment to the resulting raw-material mixture, thereby coating a carbonaceous substance onto a surface of each of the particles.

When the negative electrode comprises the lithium silicate particles and the $SiO_x$ particles, the negative electrode preferably contains the lithium silicate particles and the $SiO_x$ particles in such a proportion as (the lithium silicate particles):(the $SiO_x$ particles)=from 1.2:1 to 0.8:1 by mass ratio. The lithium silicate particles and $SiO_x$ particles contained in the negative electrode in amounts falling within the range result in declining the irreversible capacity of Li effectively.

An acceptable negative electrode further comprises binding agent for binding together the negative-electrode active material, and so forth, too, and furthermore comprises a conductive additive, as well. Note that a common negative electrode is made by adhering onto a current collector a negative-electrode active-material layer made by binding together the aforementioned negative-electrode active material at least with a binding agent. Consequently, forming the negative electrode is possible as follows: preparing a composition for forming negative-electrode active-material layer, the composition comprising the aforementioned negative-electrode material, a negative-electrode active material, a binding agent, and a conductive additive, if needed; applying the composition onto some surface of a current collector after further adding a proper solvent to the composition to turn the composition into a slurry-like substance; drying the post-coating composition; and compressing the dried composition in order to enhance the electrode density, if needed. When a current collector is thus used, the current collector is involved in the negative electrode.

The binding agent plays a role of fastening the negative-electrode material, negative-electrode active material and conductive additive together. As the binding agent, the following are exemplifiable: fluorine-containing resins, such as polyvinylidene fluoride, polytetrafluoroethylene and fluorinated rubber; thermoplastic resins, such as polypropylene and polyethylene; imide-based resins, such as polyimide and polyamide-imide; and alkoxysilyl group-containing resins.

The conductive additive is added in order to enhance the electrically-conducting property of an electrode. As the conductive additive, the following are exemplified: carbonaceous fine particles, such as carbon black, graphite, acetylene black (or AB) and KETJENBLACK (or KB); and gas-phase-method carbon fibers (or vapor grown carbon fibers (or VGCF)). One of the conductive additives is employed independently, or two or more members of the conductive additives are combinable to add to the negative electrode. Although an employment amount of the conductive additive is not at all restrictive especially, setting the employment amount is possible at from 20 to 100 parts by mass approximately when taking active materials contained in the negative electrode as 100 parts by mass, for instance.

The "current collector" refers to a chemically inactive high electron conductor for keeping an electric current flowing to electrodes during discharging or charging a nonaqueous-electrolyte secondary battery. As a material for the current collector, giving the following is possible, for instance: metallic materials, such as stainless steels, titanium, nickel, aluminum and copper; or electrically-conductive resins. As for a configuration of the current collector, porous or non-porous electrically-conductive substrates are given. As for the porous electrically-conductive substrates, the following are given, for instance: meshed bodies, netted bodies, punched sheets, lathed bodies, porous bodies, foamed bodies, and formed bodies of fibrous assemblies like nonwoven fabrics. As for the non-porous electrically-conductive substrates, foils, sheets, and films are given, for instance. As the current collector, metallic foils, such as copper foils, nickel foils, aluminum foils and stainless-steel foils, are usable suitably, for instance.

As for a method of applying the composition for forming the negative-electrode active-material layer, publicly-known conventional methods, such as roll coating methods, dip coating methods, doctor blade methods, spray coating methods and curtain coating methods, are usable.

As a solvent for viscosity adjustment, N-methyl-2-pyrrolidone (or NMP), methanol, methyl isobutyl ketone (or MIBK), and the like, are employable.

Nonaqueous-Electrolyte Secondary Battery

In addition to the above-mentioned negative electrode, a nonaqueous-electrolyte secondary battery according to the present invention further comprises a positive electrode, a separator, and an electrolytic solution, as the battery constituent elements.

The positive electrode comprises a current collector, and a positive-electrode active-material layer bound onto a surface of the current collector. The positive-electrode active-material layer includes a positive-electrode active material, and a binding agent, as well as a conductive additive, if needed. The current collector, the binding agent, and the conductive additive are the same as the counterparts described in the negative electrode.

As for the positive-electrode active material, a lithium-containing compound is given. As the lithium-containing compound, lithium-containing metallic composite oxides, such as lithium-cobalt composite oxides, lithium-nickel composite oxides and lithium-manganese composite oxides, are given, for instance. Moreover, other metallic compounds, or polymeric materials are usable as the positive-electrode active material. As for the other metallic compounds, the following are given: oxides, such as titanium oxide, vanadium oxide and manganese dioxide; or sulfides, such as titanium sulfide and molybdenum sulfide, for instance. As for the polymeric materials, electrically-conductive polymers, such as polyaniline or polythiophene, are given, for instance. Since the negative-electrode material containing lithium is included in the negative electrode according to the pre sent invention, a positive-electrode active material free from lithium is preferable as for the positive-electrode active material.

The separator is one of the constituent elements making lithium ions pass therethrough while isolating the positive electrode and negative electrode from one another and preventing the two electrodes from contacting with each other to result in electric-current short-circuiting. As for the separator, the following are employable, for instance: porous membranes made of synthetic resins, such as polytetrafluoroethylene, polypropylene, or polyethylene; or porous membranes made of ceramics.

As the electrolytic solution, electrolytic solutions usable for nonaqueous-electrolyte secondary battery are employable. The electrolytic solution includes a solvent, and an electrolyte dissolved in the solvent.

As the solvent, cyclic esters, linear or chain shape esters, and ethers are given, for instance. As the cyclic esters, the following are given, for instance: ethylene carbonate, propylene carbonate, butylene carbonate, gamma-butyrolactone, vinylene carbonate, 2-methyl-gamma-butyrolactone, acetyl-gamma-butyrolactone, and gamma-valerolactone. As the linear esters, the following are given, for instance: dimethyl carbonate, diethyl carbonate, dibutyl carbonate, dipropyl carbonate, ethyl methyl carbonate, alkyl propionate ester, dialkyl malonate ester, and alkyl acetate ester. As the ethers, the following are given, for instance: tetrahydrofuran, 2-methyltetrahydrofuran, 1,4-dioxane, 1,2-dimethoxyethane, 1,2-diethoxyethane, and 1,2-dibutoxyethane.

Moreover, as the electrolyte to be dissolved in the aforementioned electrolytic solution, a lithium salt, such as $LiClO_4$, $LiAsF_6$, $LiPF_6$, $LiBF_4$, $LiCF_3SO_3$ or $LiN(CF_3SO_2)_2$, is given, for instance.

As the electrolytic solution, a solution is given, the solution comprising a lithium salt, such as $LiClO_4$, $LiPF_6$, $LiBF_4$ or $LiCF_3SO_3$, dissolved in a concentration of from 0.5 mol/L to 1.7 mol/L approximately in a solvent, such as ethylene carbonate, dimethyl carbonate, propylene carbonate or diethyl carbonate.

Since the nonaqueous-electrolyte secondary battery according to the present invention comprises a negative electrode including the aforementioned negative-electrode material, the present nonaqueous-electrolyte secondary battery exhibits large charge and discharge capacities, and is provided with superb performance in the cyclability.

Having been described so far are the embodiment modes of the negative-electrode material for nonaqueous-electrolyte secondary battery according to the present invention, the present production process for the same, the present negative electrode for nonaqueous-electrolyte secondary battery, and the present nonaqueous-electrolyte secondary battery. However, the present invention is not an invention which is limited to the aforementioned embodying modes. The present invention is executable in various modes, to which changes or modifications that one of ordinary skill in the art carries out are made, within a range not departing from the gist of the present invention.

EXAMPLES

The present invention is hereinafter described more concretely, while giving Examples thereof.

Zeta-Potential Measurement for Carbon-Containing Compound

A zeta potential of each of the following carbon-containing compounds was measured against N-methyl-2-pyrrolidone (or NMP, a product of WAKO JUNYAKU Co., Ltd.). As the carbon-containing compounds, the following were readied: polycarbonate (or PC, Part No. MG200, a product of MITSUBISHI ENGINEERING PLASTICS Co., Ltd.); polymethyl methacrylate (or PMMA, CAS. No. 9011-14-7, a product of WAKO JUNYAKU Co., Ltd.); polyamide-imide (or PAI, Part No. 50 H, a product of TORAY-DUPONT Corporation); sucrose (CAS. No. 57-50-1, a product of WAKO JUNYAKU Co., Ltd.); polyacrylamide (or PAA, CAS. No. 9003-05-8, a product of WAKO JUNYAKU Co., Ltd.); and polyvinyl alcohol (or PVA, CAS. No. 9002-89-5, a product of WAKO JUNYAKU Co., Ltd.).

Figure 1:
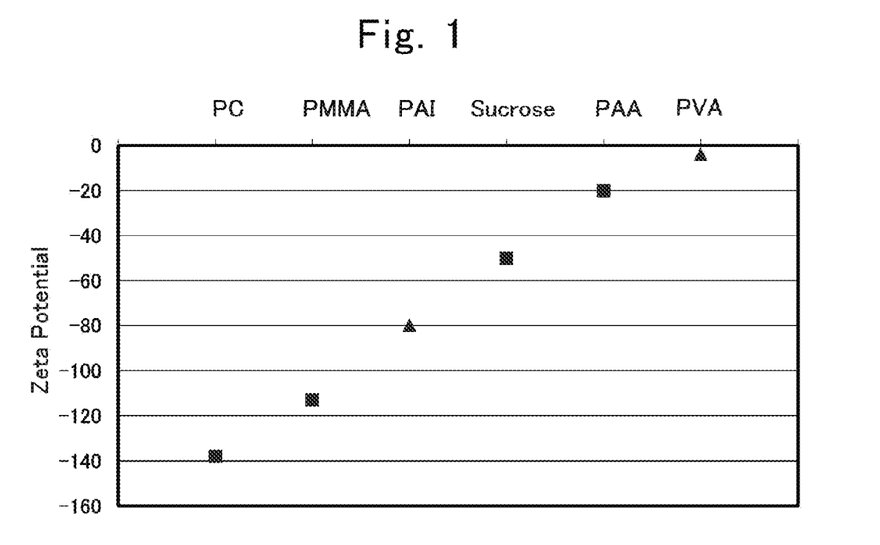
FIG. 1 is a graph showing results of zeta-potential measurement for carbon-containing compounds.

The zeta potentials were measured using "nano Partica SZ-100," a nanometer-size-particle analyzing apparatus manufactured by HORIBA SEISAKUSHO Co., Ltd. Results are shown in FIG. 1. As seen in FIG. 1, the zeta potential of PC was −138; the zeta potential of PMMA was −113; the zeta potential of PAI was −80; the zeta potential of sucrose was −50; the zeta potential of PAA was −20; and the zeta potential of PVA was −4.

Coating of Carbonaceous Substance onto Lithium Silicate Particles

Lithium silicate particles were readied. The lithium silicate particles had an average particle diameter of 30 μm, and were expressed by a compositional formula, $Li_2SiO_3$. Of the aforementioned carbon-containing compounds, the following were readied as the carbon-containing compounds: PC, PMMA, PAI, sucrose, and PAA.

First Example 3.0-gram solution comprising 0.3-gram PC dissolved in 2.7-gram NMP in a concentration of 10% by mass, and 0.3-gram $Li_2SiO_3$ were mixed so that the $Li_2SiO_3$ and PC made a ratio of 1:1 by solid-content ratio, and were then stirred in a crucible for 10 minutes, thereby preparing a mixed solution. The crucible holding the mixed solution therein was put in a tubular furnace manufactured by KOYO THERMO SYSTEM Co., Ltd., and was then heated at 800V under an argon atmosphere for 1 hour. After the heating, the crucible underwent heat dissipation to ordinary temperature, thereby obtaining a black-colored powder inside the crucible. The thus obtained powder is hereinafter called a black-colored powder according to First Example.

Second Example

Except that, instead of PC, PMMA was mixed in an amount of 0.3 grams, a black-colored powder according to Second Example was obtained in the same manner as First Example.

Third Example

Except that, instead of PC, PAI was mixed in an amount of 0.3 grams, a black-colored powder according to Third Example was obtained in the same manner as First Example.

First Comparative Example

Except that, instead of PC, sucrose was mixed in an amount of 0.3 grams, a black-colored powder according to First Comparative Example was obtained in the same manner as First Example.

Second Comparative Example

Except that, instead of PC, PAA was mixed in an amount of 0.3 grams, a black-colored powder according to Second Comparative Example was obtained in the same manner as First Example.

Observation by Scanning Electron Microscope (or SEM)

Figure 2:
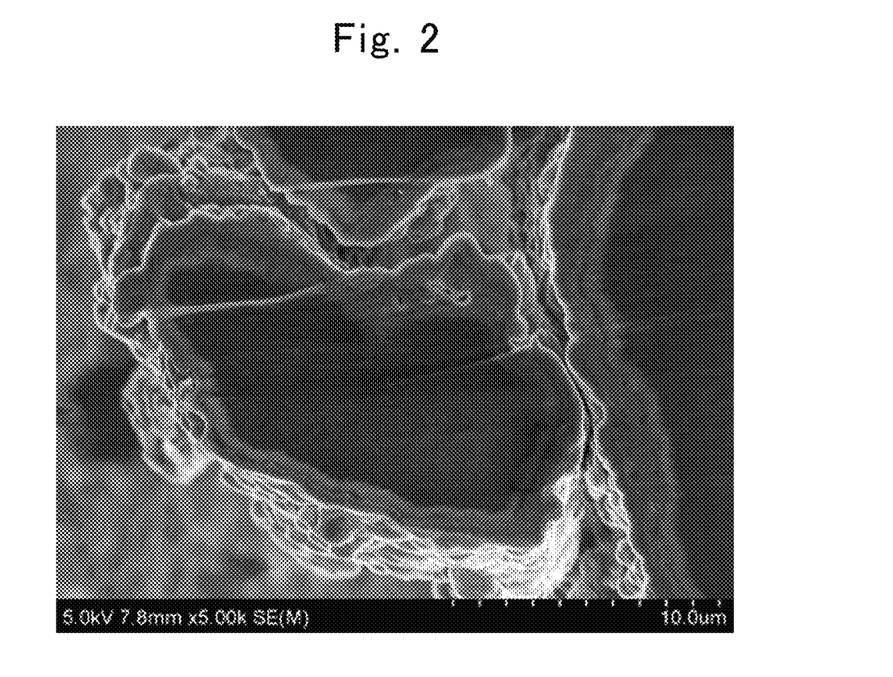
FIG. 2 is an SEM photograph of First Example.
Figure 3:
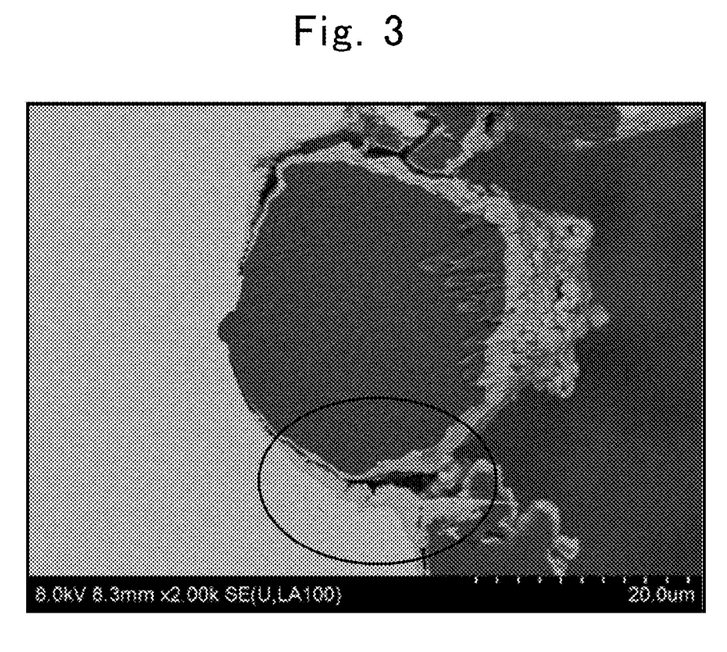
FIG. 3 is an SEM photograph of First Comparative Example.

A cross section of the black-colored powder according to First Example, and a cross section of the black-colored powder according to First Comparative Example were observed by an SEM. An SEM photograph of First Example is shown in FIG. 2, and an SEM photograph of First Comparative Example is shown in FIG. 3. In FIG. 2, an appearance was observed wherein a coating matter coated in about 1-μm-thick thickness on the surface of $Li_2SiO_3$ taking on an oval shape with 20 μm in the major diameter and with 10 μm in the minor diameter in the cross-sectional configuration. The coating matter covered the entire particulate surface, and no cut or break was observed in the coating matter over the entirety. In FIG. 3, a scene was observed wherein powder-shaped stuff was coating on the surface of $Li_2SiO_3$ taking on a circular shape with about 30 μm in the diameter in the cross-sectional configuration. The coating matter had different thicknesses depending on locations. Moreover, as seen in the interior marked circularly in FIG. 3, another scene was observed wherein cracks were cutting in parallelly along the surface of the coating matter in the interior of the coating matter.

Measurement of Raman Spectra

A Raman spectrum of the black-colored powder according to First Example was measured. The Raman spectrum was a spectrum measured by "NRS-3300" manufactured by JASCO Corporation. An example of the Raman spectrum of First Example is shown in FIG. 4.

Figure 4:
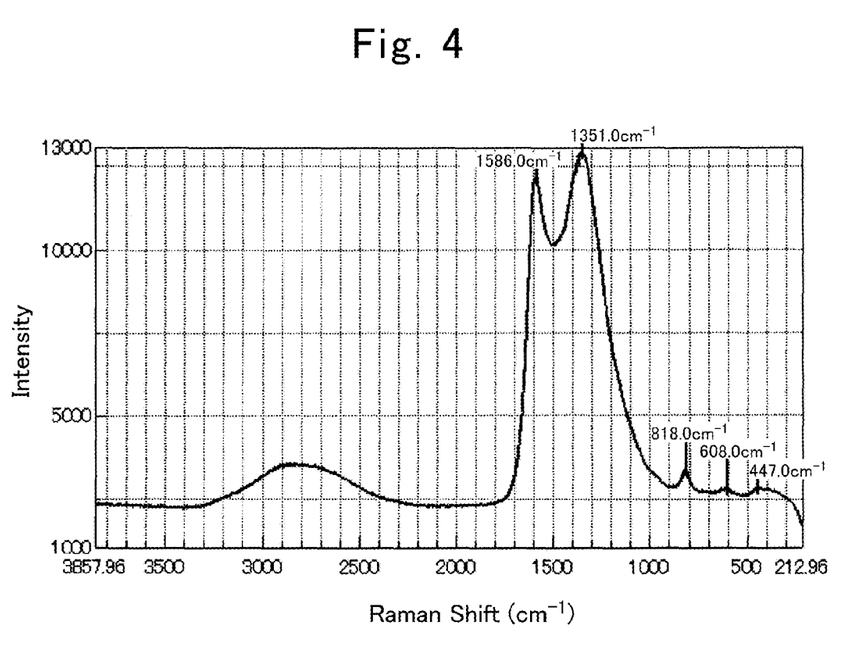
FIG. 4 illustrates an example of Raman spectra of First Example.

In the Raman spectrum shown in FIG. 4, two broad peaks were observed to exist at around 1,360-cm$^{-1}$ Raman shift and at around 1,580-cm$^{-1}$ Raman shift at a virtually same extent of height one another. Since both "D" band "G" band emerged definitely, the existence of carbon with an amorphous structure was found. From the finding, the existence of a carbonaceous substance comprising an amorphous structure on some surface of Li$_2$SiO$_3$ was ascertainable in the black-colored powder according to First Example.

Measurement of pH

In order to compare how much the surface of Li$_2$SiO$_3$ was coated by a carbonaceous substance, the powders according to First Example through Third Example and First Comparative Example and Second Comparative Example were dissolved in pure water to measure a pH of the respective solutions. Since Li$_2$SiO$_3$ is basic strongly, the pH of a solution comprising Li$_2$SiO$_3$ dissolved in pure water in a concentration of 10% by mass is 12. When certain coating is done to the surface of Li$_2$SiO$_3$, the resulting pH is anticipated to fall below 12.

The measured results were as follows: the pH was 8 in First Example; the pH was 9 in Second Example; the pH was 10 in Third Example; the pH was 12 in First Comparative Example; and the pH was 12 in Second Comparative Example.

From the above results, a carbonaceous substance was understood to coat on at least some of the surface of Li$_2$SiO$_3$ in First Example, Second Example and Third Example. Moreover, although the surface of Li$_2$SiO$_3$ in First Comparative Example was covered with micro-particular stuff as seen in the SEM photograph in FIG. 3, the measured result of the pH was a pH of 12, which was the same as the pH of Li$_2$SiO$_3$. From the fact, the coating property of a carbonaceous substance according to First Comparative Example was poor, and thereby the carbonaceous substance according to First Comparative Example was understood to have been come off when being solved in pure water, or not to have coated the surface of Li$_2$SiO$_3$ to such an extent as enabling the pH of Li$_2$SiO$_3$ to lower, even though the carbonaceous substance was not come off.

From the above, using a carbon-containing compound with the zeta-potential absolute value being 60 or more was understood to enable a carbonaceous substance comprising an amorphous structure to coat the surface of Li$_2$SiO$_3$.

The invention claimed is:

1. A negative-electrode material for nonaqueous-electrolyte secondary battery, the negative-electrode material comprising lithium silicate particles having a surface at least some of which is coated by a carbonaceous substance formed by heating a carbon-containing compound at a thermal decomposition temperature of said carbon-containing compound or more and 1,100° C. or less, said carbon-containing compound being a solid at room temperature and exhibiting a zeta-potential absolute value being 60 or more against N-methyl-2-pyrrolidone (or NMP).

2. The negative-electrode material for nonaqueous-electrolyte secondary battery as set forth in claim 1, wherein said lithium silicate particles are at least one member selected from the group consisting of Li$_4$SiO$_4$, Li$_2$SiO$_3$, Li$_2$Si$_2$O$_5$, Li$_4$Si$_3$O$_8$, Li$_6$Si$_4$O$_{11}$, and LiSiO$_{1.5}$.

3. The negative-electrode material for nonaqueous-electrolyte secondary battery as set forth in claim 1, wherein said carbon-containing compound is at least one member selected from the group consisting of polycarbonate (or PC), polymethyl methacrylate (or PMMA), and polyamide-imide (or PAI).

4. A production process for negative-electrode material for nonaqueous-electrolyte secondary battery, the production process comprising:
  a carbon-containing compound selection step of selecting a carbon-containing compound being solid at room temperature and exhibiting a zeta-potential absolute value being 60 or more against N-methyl-2-pyrrolidone (or NMP);
  a solution preparation step of preparing a carbon-containing compound solution by dissolving said carbon-containing compound selected at said carbon-containing compound selection step in an organic solvent in a concentration of from 5% by mass to 50% by mass;
  a mixing step of preparing a mixture by mixing lithium silicate particles with said carbon-containing compound solution in such a solid-content ratio as (said lithium silicate particles):(said carbon-containing compound)=from 10:1 to 10:100; and
  a heating step of heating said mixture at a thermal decomposition temperature of said carbon-containing compound or more and 1,100° C. or less under an inert atmosphere, or under a reducing atmosphere.

5. The production process for negative-electrode material for nonaqueous-electrolyte secondary battery as set forth in claim 4, wherein said carbon-containing compound to be selected is polycarbonate (or PC), polymethyl methacrylate (or PMMA), or polyamide-imide (or PAI).

6. A negative electrode for nonaqueous-electrolyte secondary battery, the negative electrode comprising the negative-electrode material for nonaqueous-electrolyte secondary battery as set forth in claim 1.

7. The negative electrode for nonaqueous-electrolyte secondary battery as set forth in claim 6, the negative electrode further comprising a negative-electrode active material including SiO$_x$ (where 0<"x"<2) or Si.

8. A nonaqueous-electrolyte secondary battery comprising the negative electrode for nonaqueous-electrolyte secondary battery as set forth in claim 6.

9. The negative-electrode material for nonaqueous-electrolyte secondary battery as set forth in claim 1, wherein said carbonaceous substance comprises an amorphous structure showing a peak (or "D" band) at around 1,360 cm$^{-1}$ and another peak (or "G" band) at around 1,580 cm$^{-1}$ in a Raman shift.

10. A production process for negative-electrode material for nonaqueous-electrolyte secondary battery, the production process comprising:
  a carbon-containing compound selection step of selecting a carbon-containing compound being solid at room temperature and exhibiting a zeta-potential absolute value being 60 or more against N-methyl-2-pyrrolidone (or NMP);
  a solution preparation step of preparing a carbon-containing compound solution by dissolving said carbon-containing compound selected at said carbon-containing compound selection step in an organic solvent in a concentration of from 5% by mass to 50% by mass;
  a mixing step of preparing a mixture by mixing a particulate mixture including lithium silicate particles and SiO$_x$ particles (where 0<"x"<2) or Si particles with said carbon-containing compound solution in such a solid-content ratio as (said particulate mixture):(said carbon-containing compound)=from 10:1 to 10:100; and a heating step of heating said mixture at a thermal decomposition temperature of said carbon-containing compound or more and 1,100° C. or less under an inert atmosphere, or under a reducing atmosphere.

* * * * *